US006810596B2

(12) United States Patent
Fung et al.

(10) Patent No.: US 6,810,596 B2
(45) Date of Patent: Nov. 2, 2004

(54) DRILL LEVEL INDICATOR

(75) Inventors: George C H Fung, New Territories (HK); Patrick C K Kwok, Tseung Kwan O (HK); Vincent P. Cooper, Baltimore, MD (US); Leo Driessen, Yuen Long N.T. (HK); Chan Ka Shing, Tuen Mun (HK)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/075,927

(22) Filed: Feb. 13, 2002

(65) Prior Publication Data

US 2003/0029050 A1 Feb. 13, 2003

Related U.S. Application Data

(63) Continuation of application No. 09/915,834, filed on Jul. 26, 2001, now abandoned.

(51) Int. Cl.[7] ............ B23B 49/00; G01C 9/12
(52) U.S. Cl. ............ 33/334; 33/366.11
(58) Field of Search ............ 33/334, 333, 366.11, 33/366.23, 366.24, 363 K

(56) References Cited

U.S. PATENT DOCUMENTS

| | | | | | |
|---|---|---|---|---|---|
| 4,189,726 | A | * | 2/1980 | Rosa et al. | 33/334 |
| 4,446,729 | A | * | 5/1984 | Watson, III | 33/363 K |
| 4,492,029 | A | * | 1/1985 | Tanaka et al. | 33/366.14 |
| 4,564,322 | A | * | 1/1986 | Stapley | 33/334 |
| 4,577,414 | A | * | 3/1986 | Migliori et al. | 33/363 K |
| 5,469,630 | A | * | 11/1995 | Lewis | 33/355 R |
| 6,202,488 | B1 | * | 3/2001 | Cash | 33/366.23 |
| 6,392,223 | B1 | * | 5/2002 | Hjertman et al. | 33/366.11 |

* cited by examiner

*Primary Examiner*—Christopher W. Fulton
(74) *Attorney, Agent, or Firm*—Harness, Dickey & Pierce, P.L.C.

(57) ABSTRACT

A power tool includes a leveling device which includes a rotatable member which seeks an equilibrium position which corresponds to a level position. A rotating device includes a member which enables passage of a beam. An electrical circuit which includes an emitting device, a receiving device and an indicating device is electrically coupled such that upon activation, the emitting device emits a beam which passes through the beam passing member. The beam is received by the receiving device which, in turn, activates the indicator device. The indicator is generally a light emitting device which has a varying brightness so that the user may view the indicator from all sides of the power tool.

28 Claims, 4 Drawing Sheets

DRILL LEVEL INDICATOR

FIELD AND BACKGROUND OF THE INVENTION

The present invention relates to power tools and, more particularly, to a leveling device that indicates when the power tool is in a level position.

In various types of power tools, especially drilling tools, it is desirable to know when the tool is in a horizontal or vertical plane. This is particularly useful when drilling holes for hanging doors or the like when it is desirable to have holes which are in plane with horizontal.

Bubble types of levels have been utilized in power tools. However, these types of leveling devices have various shortcomings. While the bubble level works satisfactorily for horizontal applications, it is still burdensome on the user to view the bubble in between the lines. Ordinarily, these bubble types of levels are not conducive for vertical drilling. Also, due to the vibration of the tool, frothing occurs inside the level, rendering the bubble level useless in many applications.

Another type of measuring device utilizes a simple pendulum with a rigid straight bar connecting the pivot point with a hanging weight together with a cross bar mounted at ninety (90°) degrees to a vertical bar. The cross bar can be disposed on either side of the pivot point when the pivot level is hung and the weight achieves equilibrium, the cross bar will be positioned in a horizontal plane. Accordingly, the ends may be aligned with two notches on a carrier board to align the board to the horizontal and thus measure the horizontal plane.

Both of these devices require the user to have an accurate view of the level during drilling to maintain the plane of the power tool. Also, while these types of devices may be satisfactory in horizontal drilling planes, they are not particularly useful when used in a vertical drilling arrangement.

Accordingly, it is an object of the present invention to provide a user with an easy to use leveling device. The device indicates to the user, usually by an illuminated light, that horizontal or vertical planes have been achieved. The present invention enables the user to readily establish visual contact to indicate that a desired level position has been achieved.

SUMMARY OF THE INVENTION

In accordance with a first embodiment of the present invention, a power tool leveling device comprises a housing with a cavity in the housing. A rotating member is positioned in the housing. The rotating member moves in the cavity such that the rotating member seeks an equilibrium position. The equilibrium position corresponds to a level position. At least one member is associated with the rotating member to enable passage of light through the rotating member. An electrical circuit is associated with the rotating member. The electrical circuit includes an emitting device, a receiving device, and an indicator device. These devices are electrically coupled such that upon activation, the emitting device emits a beam which passes through the at least one member. The beam is received by the receiving device which, in turn, activates the indicator device. The indicator device informs a user that the leveling device is in an equilibrium position. Also, a power source is coupled with the electrical circuit to energize the electrical circuit. The electrical circuit further includes a device for varying current to the indicator device such that as the beam intensity at the receiver device increases, the indicator device increases in intensity. This corresponds to leveling; e.g., as the tool becomes more level, the intensity increases. The device for varying the current is a PNP transistor. The indicator device is a light emitting device. The light emitting device has a variable intensity from off to full on. In the full on position the leveling device is in its level position. The at least one member in the rotating member is an aperture. In an alternate embodiment, the aperture includes a lens for refracting the beam. In a second alternate embodiment, a lens is positioned between the rotating member and the receiving device to refract the beam. Also, the at least one aperture may be an elongated slot. Further, the at least one member may be an optic fiber to transmit the beam. Also, a switch is coupled with the leveling device for activating and deactivating the electrical circuit.

In accordance with a second aspect of the invention, a power tool comprises a housing with a motor in the housing. An output is coupled with the motor. An activation member to energize the motor for rotating the output is coupled with the motor. A power source is electrically coupled with the motor and activation member. A leveling device is present in the housing. The leveling device comprises a housing with a cavity in the housing. A rotating member is positioned in the housing. The rotating member moves in the cavity such that the rotating member seeks an equilibrium position. The equilibrium position corresponds to a level position. At least one member is associated with the rotating member to enable passage of light through the rotating member. An electrical circuit is associated with the rotating member. The electrical circuit includes an emitting device, a receiving device, and an indicator device. These devices are electrically coupled such that upon activation, the emitting device emits a beam which passes through the at least one member. The beam is received by the receiving device which, in turn, activates the indicator device. The indicator device informs a user that the leveling device is in an equilibrium position. Also, a power source is coupled with the electrical circuit to energize the electrical circuit. The electrical circuit further includes a device for varying current to the indicator device such that as the beam intensity at the receiver device increases, the indicator device increases in intensity. This corresponds to leveling; e.g., as the tool becomes more level, the intensity increases. The device for varying the current is a PNP transistor. The indicator device is a light emitting device. The light emitting device has a variable intensity from off to full on. In the full on position the leveling device is in its level position. The at least one member in the rotating member is an aperture. In an alternate embodiment, the aperture includes a lens for refracting the beam. In a second alternate embodiment, a lens is positioned between the rotating member and the receiving device to refract the beam. Also, the at least one aperture may be an elongated slot. Further, the at least one member may be an optic fiber to transmit the beam. Also, a switch is coupled with the leveling device for activating and deactivating the electrical circuit.

In accordance with a third aspect of the invention, a power tool comprises a housing with a motor within the housing. An output is coupled with the motor. An activation member energizes the motor to rotate the output which is coupled with an output source and the motor. A leveling device is coupled with the power tool. The leveling device includes an indicator such that upon activation of the leveling device the indicator indicates to a user that the leveling device is in an equilibrium position. The leveling device is also coupled with the power source. The indicator is positioned on the housing such that a user may view the indicator from all sides of the housing when the power tool is in use. The indicator varies in intensity as the leveling position is reached. The indicator is ordinarily a light emitting device. Accordingly, the light emitting device varies in brightness, being brightest when the power tool is in the level position. Also, a switch is coupled with the activation member for activating the leveling device prior to activating the motor.

From the following detailed description, taken in conjunction with the drawings and subjoined claims, other objects and advantages of the present invention will become apparent to those skilled in the art.

DETAILED DESCRIPTION OF THE PREFERRED EMBODIMENTS

Figure 1:
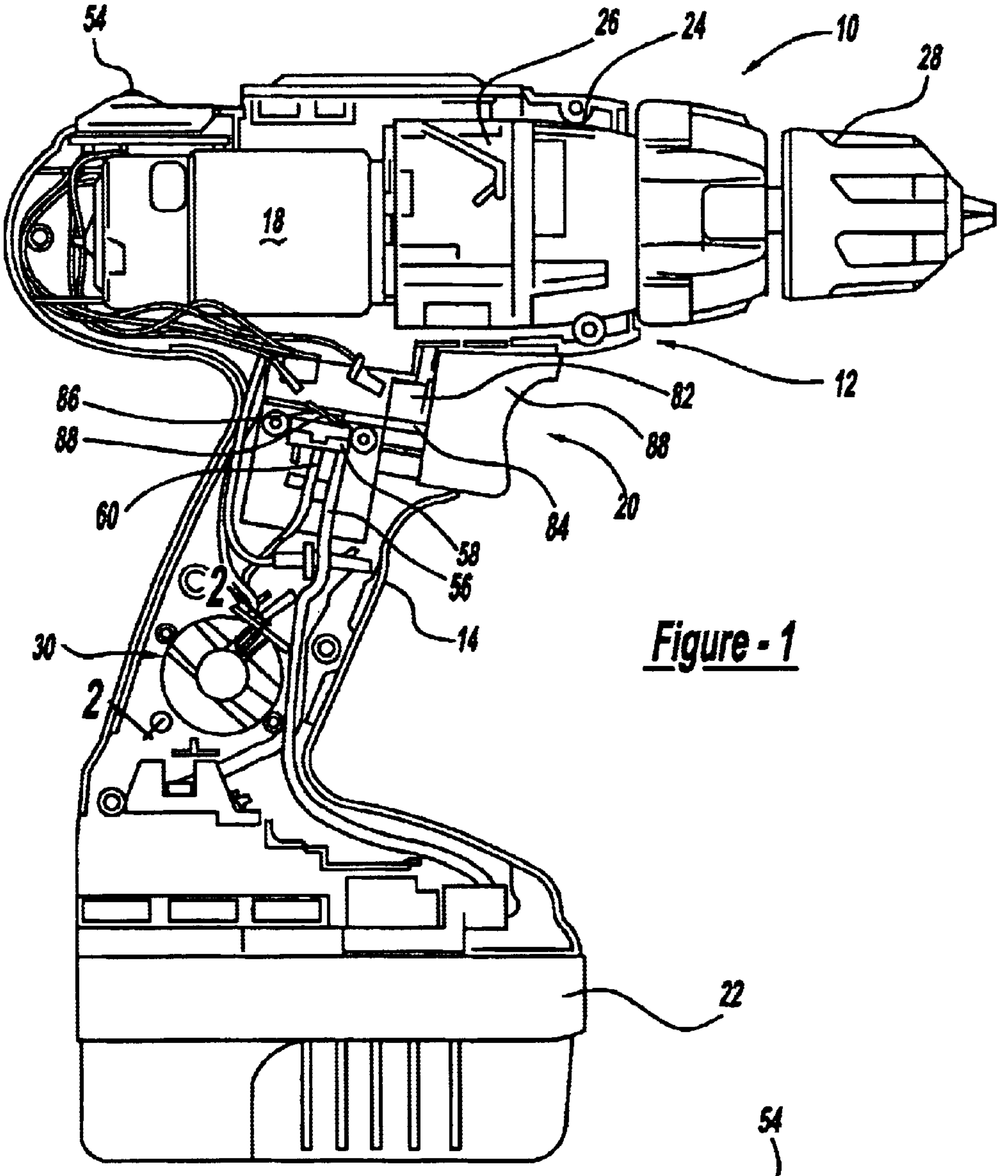
FIG. 1 is a plan view partially in section of a drill with a leveling device in accordance with the present invention.

Turning to the figures, FIG. 1 illustrates a power tool in accordance with the present invention and is designated with the reference numeral 10. The power tool 10 is illustrated as a drill; however, any type of power tool such as a screwdriver, sander, rotary tool, clippers, hedge trimmer, saw or the like may be utilized with the level indicator in accordance with the present invention. The power tool 10 includes a housing 12 which includes two halves 14 which surround a motor 18. An activation member 20 is coupled with the motor as well as with a power source 22. The power source 22 may be a power cord (AC current) or the power tool may have a battery (DC current) as shown. The motor 18 is coupled with an output 24 which may include a transmission 26 and a chuck 28 to retain the tool with the drill.

Figure 3:
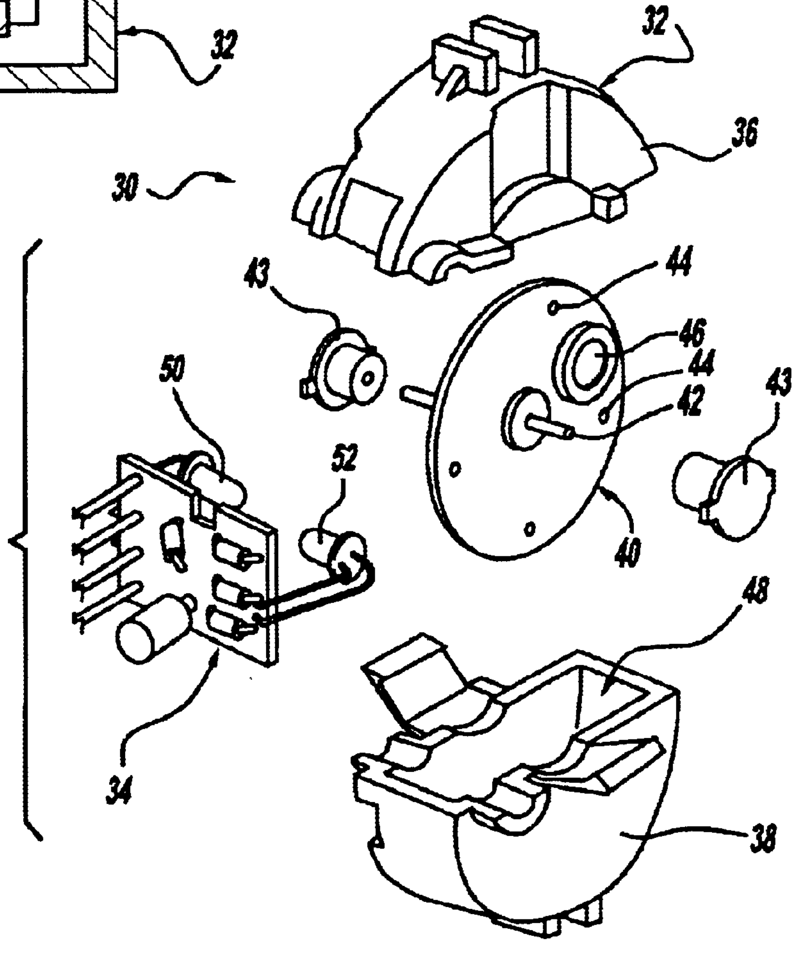
FIG. 3 is an exploded perspective view of a level indicator in accordance with the present invention.

A level indicator 30 is positioned in the housing half 14. The level indicator 30 includes a housing 32 and circuitry 34. Turning to FIG. 3, the level indicator housing 32 includes two halves 36 and 38 which are secured together, preferably by a snap fit. A rotatable member 40 is rotatably positioned within the housing half 36. The rotatable member 40 has an overall disc shape with an axle 42 extending through the center of the rotatable member 40, and with the axle ends in blocks 43. Also, apertures 44, preferably four in number, are formed in the disc 40. Also, a counter-weight 46 is coupled with the rotating member 40.

The rotatable member 40 rotates within a cavity 48 in the housing halves 36 and 38 about the axle 42. The counter-weight 46 provides a weighted side of the rotatable member 40 so that the rotatable member 40 is always seeking an equilibrium position. The apertures 44 are positioned about the rotatable member 40 at zero (0°) degrees, ninety (90°) degrees, one hundred eighty (180°) degrees, and two hundred seventy (270°) degrees about a three hundred sixty (360°) degree circle of the rotating member 40. The apertures 44 have a desired size, preferably with a diameter of 0.5 mm. which enables sensing as will be described herein. The rotatable member 40 rotates throughout three hundred sixty (360°) degrees within the housing 32 as the power tool is manipulated.

Figure 4:
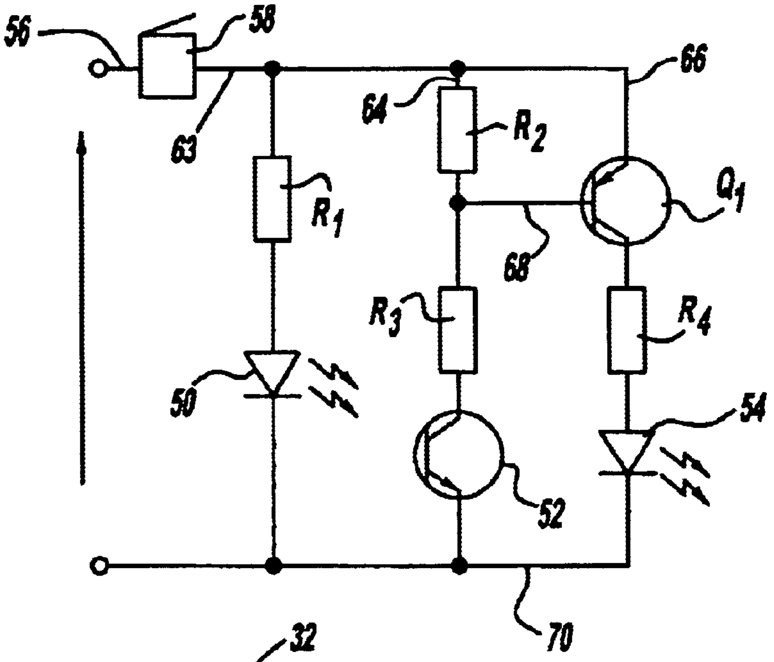
FIG. 4 is a schematic view of the electrical circuit of the leveling device.

Circuitry 34 is best defined in FIG. 4. Broadly speaking, the circuitry includes a light emitter 50, a light receiver 52 and an indicator 54. Lead 56 extends from the power source 22 to switch 58. Lead 60 leads from the switch 58 to the emitter 50. Also, a resistor R1 is electrically coupled in lead 60. R1 may have a value as illustrated in Chart 1 below, varying with the voltage of the power source. Lead 60 is coupled with lead 64 which electrically couples the switch with the receiver 52. Lead 64 extends from lead 60 to the receiver 52. A pair of resistors R2 and R3 are electrically coupled in lead 64 extending to the receiver 52. Lead 60 is electrically coupled with lead 66. Lead 66 is electrically coupled with the indicator 54. Transistor Q1 is electrically coupled in lead 66. Transistor Q1 is a PNP transistor. Thus, a base lead 68 is coupled with lead 64 between resistors R2 and R3. A fourth resistor R4 is coupled with lead 66 between the transistor Q1 and the indicator 54. Further, lead 70 is coupled with the power source 22, leads 62, 64 and 66.

The emitter 50 is preferably an infrared emitter generating a stream of light towards the receiver 52. Preferably, the emitter 50 is axially positioned 2:1 mm. away from the rotatable member 40. The receiver 52 is preferably a phototransistor to receive the light generated from the infrared LED 50. Preferably, the phototransistor 52 is axially positioned 1.5 mm. away from the rotatable member 40. The indicator 54 is preferably an LED having a desired color such as red.

The leveling device 30 operates as follows. The trigger 17 of the activation member 20 is pushed inward to contact switch 58. As this occurs, the circuit is activated. However, the switch 58 is activated before the motor 14. Upon activation of the switch 58, the circuit is closed so that current moves through the lead 60. As current moves through the lead 60, current passes to the emitter 50 turning on the emitter 50 generating a light beam 72. If the rotatable member 40 is in a non-level or non-equilibrium position, the apertures 44 do not align with the beam 72 and therefore light does not pass across the rotatable member 40 and light is not sensed by the receiver 52. In this case, the indicator 54 does not illuminate. This is due to the fact that the current at lead 68 is blocked and therefore the transistor Q1 does not allow current to pass to the indicator LED 54.

Once the leveling device approaches an equilibrium or level position so that the power tool is on or near a horizontal or vertical plane, one of the apertures 44 is in alignment with the beam 72 from the infrared LED 50. As this occurs, the beam 72 passes through the rotatable member 40. The beam 72 is sensed by the phototransistor receiver 52. As this occurs, the receiver phototransistor 52 is energized. As this occurs, current passes from lead 60 through lead 64 to lead 70 completing that circuit. As this happens, the current in base lead 68 is conductive. As the transducer Q1 senses the change in current between the emitter and base, current begins to flow from the collector to the emitter along lead 66. As this occurs, current flows to indicator LED 54 illuminating the indicator 54.

Since small apertures 44 are used which may have a conical shape, the beam intensity increases through the rotatable member 40, as the rotatable member 40 becomes more level and the apertures 44 are centered and directly in line with the beam 72. As this occurs, the receiver phototransistor 52 senses a higher intensity in the beam 72. Thus, more current passes through the phototransistor 52. As this occurs, the current sensed by the base of the transistor Q1 increases in lead 68. As this occurs, the transistor Q1 senses an increase in base current of the PNP transistor. As this occurs, the PNP transistor Q1 enables more current to pass through it which, in turn, increases the intensity of the illumination of the indicator 54. Thus, a variable output is established. The indicator 54 varies in intensity from off to its brightest point when the leveling device is in its most level position.

A plus or minus six (6°) degree range from level is present where the light goes on. When the tool is further than six (6°) degrees away from level, the light is in an off position. When the power tool comes within the six (6°) degrees of level range, the light begins to turn on. As the light hits the level position, the light at its brightest. As it approaches the other side of the six (6°) degrees (positive or negative), the light would again go off. Thus, the user can determine if he is high or low of the level position when the light is the brightest.

A chart is provided below which provides the values of $R_1$, $R_2$, $R_3$ and $R_4$ in the above circuit diagram. Note that the values of $R_1$ and $R_4$ vary depending upon the voltage of the power source.

| VOLTAGE | $R_1$ | $R_2$ | $R_3$ | $R_4$ |
|---|---|---|---|---|
| 9.6 | 1.8 K | 10 K | 10 K | 1.8 K |
| 12.0 | 3.3 K | 10 K | 10 K | 2.2 K |
| 14.4 | 4.3 K | 10 K | 10 K | 2.7 K |
| 18.0 | 6.8 K | 10 K | 10 K | 3.5 K |

Figure 1A:
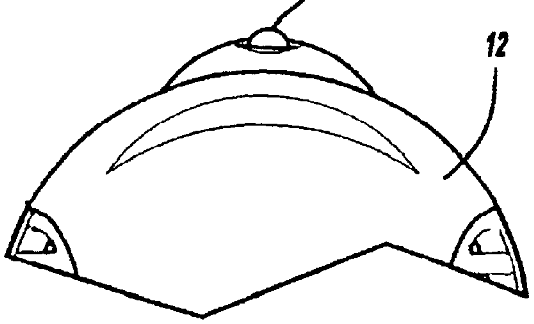
FIG. 1*a* is a partial rear perspective view of the drill of FIG. 1.
Figure 2:
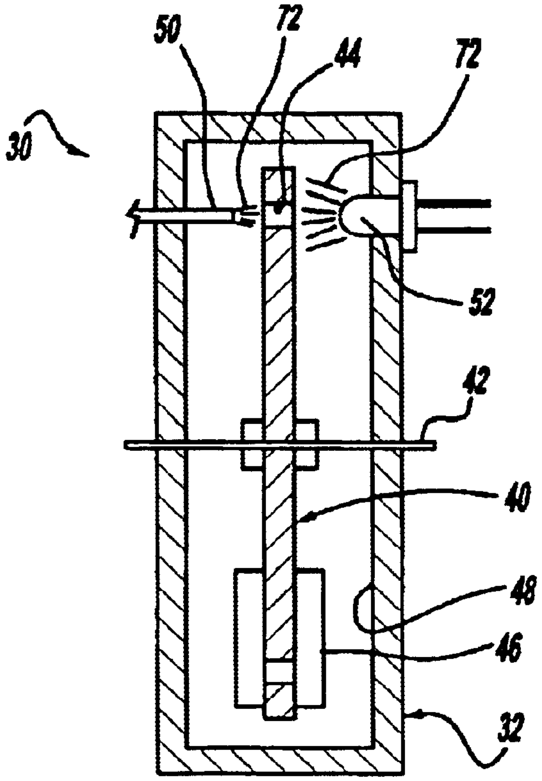
FIG. 2 is a cross-section view of FIG. 1 along lines II—II thereof.

The indicator LED 54 is positioned between the housings at a top rear position of the tool. When the tool is used by a user, the user ordinarily is positioned behind the tool. Also, as illustrated in FIGS. 1 and 1*a*, the indicator LED is ordinarily positioned above the contour of the housing so that the LED can be viewed by the user from all sides and angles of use of the drill. Thus, the user can readily view whether or not the light is illuminated and the power tool is level.

As can be seen in FIG. 1, the activation member 20 includes trigger 80 for activating the motor. The trigger 80 includes a plunger shaft 82 as well as a leaf contact actuator 84. The leaf contact actuator 84 contacts the micro-switch 58 for activating the leveling circuit. The leaf contact actuator 84 contacts the leaf contact 86 which pushes down the plunger 88 actuating the switch 58.

Figure 5:
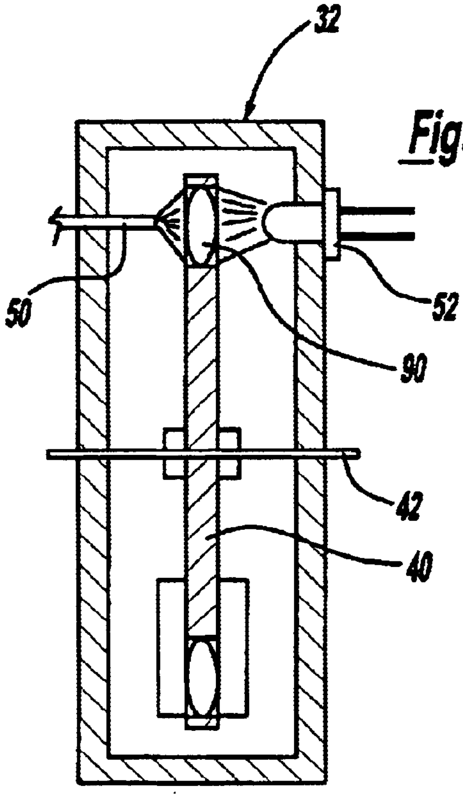
FIG. 5 is a section view of an alternate embodiment of a leveling device.

Turning to FIG. 5, a second embodiment of the leveling device is shown. Here, the leveling device is substantially similar to that as previously described. The difference is that lenses 90 are positioned in apertures 44 to enhance the refractiveness of the beam 72.

Figure 6:
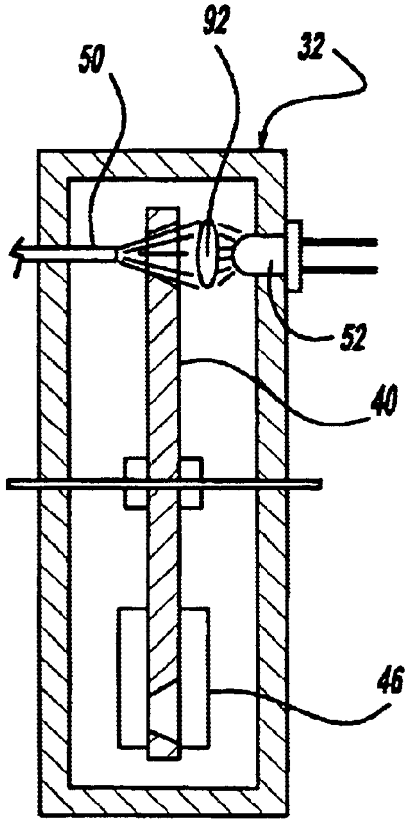
FIG. 6 is a cross-section view of an alternate embodiment of the present invention.

Turning to FIG. 6, an additional embodiment is shown. Here, the embodiment is the same as previously described. However, a lens 92 is positioned between the rotative member 40 and the receiver 52 to enhance the beam passing through the apertures 44.

Figure 7:
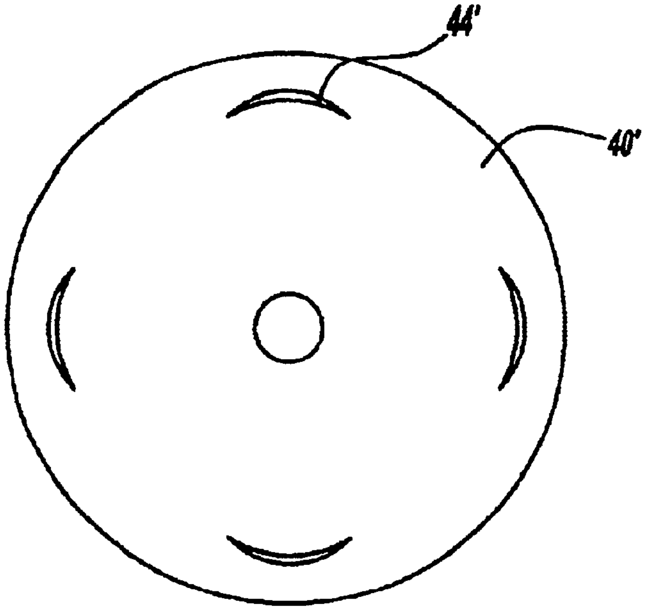
FIG. 7 is a perspective view of an alternate embodiment of the present invention.

Turning to FIG. 7, an additional embodiment is shown. FIG. 7 illustrates a rotatable member 40'. Here, the apertures 44' have an elongated shape enhancing the variable output of the indicator 54.

Figure 8:
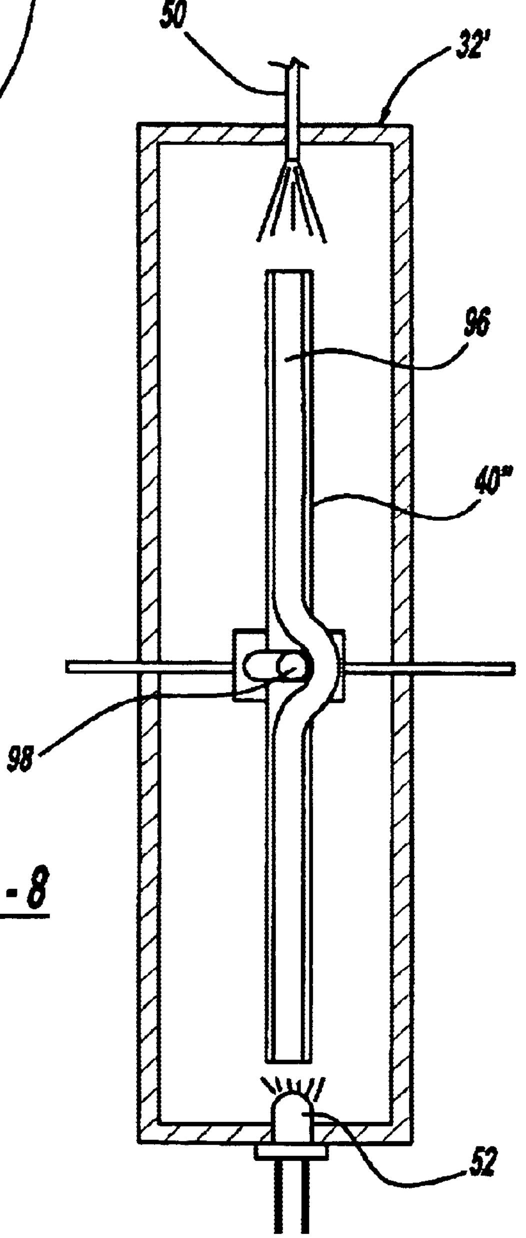
FIG. 8 is a cross-section view of an alternate embodiment of the present invention.

Turning to FIG. 8, an additional embodiment is shown. In FIG. 8, optic fibers 96 and 98 are positioned in rotatable member 40'. The optical members extend like spokes across the rotating member 40. Also, the emitter 50 and receiver 52 are positioned radially with respect to the rotatable member.

While the above detailed description describes the preferred embodiment of the present invention, the invention is susceptible to modification, variation and alteration without deviating from the scope and fair meaning of the subjoined claims.

What is claimed is:

1. A power tool leveling device, comprising:

a housing, a cavity in said housing;

a rotating member in said housing, said rotating member moving in said cavity such that said rotating member seeks an equilibrium position which corresponds to a level position;

at least one member associated with said rotating member for enabling passage of a beam through said rotating member;

an electrical circuit including an emitting device, a receiving device, and an indicator device electrically coupled such that upon activation, said emitting device emits a beam which passes through said at least one member, said beam received by said receiving device which, in turn, activates said indicator device indicating to a user that said leveling device is in or near an equilibrium position and said electrical circuit further including a device for varying current to said indicator device such that as the beam intensity at the receiver device increases, the indicator device increases in intensity; and a power source coupled with said electrical circuit for energizing said electrical circuit.

2. The leveling device according to claim 1, wherein said device for varying current being a PNP transistor.

3. The leveling device according to claim 1, wherein said indicator being a light emitting device.

4. The leveling device according to claim 3, wherein the light emitting device has a variable intensity from off to full on, when full on the leveling device being in a level position.

5. The leveling device according to claim 1, wherein said at least one member in said rotating member being an aperture.

6. The leveling device according to claim 5, wherein a lens positioned in said aperture for refracting said beam.

7. The leveling device according to claim 5, wherein a lens being positioned between said rotating member and said receiving device for refracting said beam.

8. The leveling device according to claim 5, wherein said at least one aperture being an elongated slot.

9. The leveling device according to claim 1, wherein said at least one member being an optic fiber for refracting said beam.

10. The leveling device according to claim 1, further comprising a switch for activating and deactivating said electrical circuit.

11. A power tool, comprising:

a housing;

a motor within said housing;

an output coupled with said motor;

an activation member for energizing said motor for rotating said output;

a power source electrically coupled with said motor and said activation member; and a leveling mechanism comprising:

a housing, a cavity in said housing;

a rotating member in said housing, said rotating member moving in said cavity such that said rotating member seeks an equilibrium position which corresponds to a level position;

at least one member associated with said rotating member for enabling passage of a beam through said rotating member;

an electrical circuit including an emitting device, a receiving device, and an indicator device electrically coupled such that upon activation, said emitting device emits a beam which passes through said at least one member, said beam received by said receiving device which, in turn, activates said indicator device indicating to a user that said leveling device is in or near an equilibrium position and said electrical circuit further including a device for varying current to said indicator device such that as the beam intensity at the receiver device increases, the indicator device increases in intensity; and a power source coupled with said electrical circuit for energizing said electrical circuit.

12. The power tool according to claim 11, wherein said device for varying current being a PNP transistor.

13. The power tool according to claim 11, wherein said indicator being a light emitting device.

14. The power tool according to claim 13, wherein the light emitting device has a variable intensity from off to full on, when full on the leveling device being in a level position.

15. The power tool according to claim 11, wherein said at least one member in said rotating member being an aperture.

16. The power tool according to claim 15, wherein a lens positioned in said aperture for refracting said beam.

17. The power tool according to claim 15, wherein a lens being positioned between said rotating member and said receiving device for refracting said beam.

18. The power tool according to claim 15, wherein said at least one aperture being an elongated slot.

19. The power tool according to claim 11, wherein said at least one member being an optic fiber for refracting said beam.

20. The power tool according to claim 11, further comprising a switch for activating and deactivating said electrical circuit.

21. A power tool, comprising:

a housing;

a motor within said housing;

an output coupled with said motor;

an activation member for energizing said motor for rotating said output;

a power source electrically coupled with said motor and said activation member; and a leveling mechanism comprising:

a housing, a cavity in said housing;

a rotating member in said housing, said rotating member moving in said cavity such that said rotating member seeks an equilibrium position which corresponds to a level position;

at least one member associated with said rotating member for enabling passage of light through said rotating member;

an electrical circuit including an emitting device, a receiving device, and an indicator device electrically coupled such that upon activation, said emitting device emits a beam which passes through said at least one member, said beam received by said receiving device which, in turn, activates said indicator device indicating to a user that said leveling device is in or near an equilibrium position; and a power source coupled with said electrical circuit for energizing said electrical circuit;

wherein said indicator device being positioned on said housing such that a user may view said indicator device from all sides of said housing when said power tool is in use and said indicator device varying in intensity.

22. The power tool according to claim 21, wherein said indicator being a light emitting device.

23. The power tool according to claim 22, wherein said light emitting device varying in brightness, being brightest when said power tool is in said level position.

24. The power tool according to claim 22, wherein a switch is coupled with said activation member for activating said leveling device prior to activating said motor.

25. A power tool, comprising:

a housing;

a motor within said housing;

an output coupled with said motor;

an activation member for energizing said motor for rotating said output;

a power source electrically coupled with said motor and said activation member; and a leveling mechanism, said leveling mechanism including:

an electrical circuit including an indicator device electrically coupled such that upon activation, said indicator device varying in intensity as said leveling device approaches a level position and said indicator devices increases in intensity until said tool is level and said indicator devices decreases in intensity as said tool moves out of level; and a power source coupled with said electrical circuit for energizing said electrical circuit.

26. The power tool according to claim 25, wherein said activation member includes a position for activating said level indicator without energizing said motor.

27. A power tool leveling device, comprising:

a housing, a cavity in said housing;

a member in said housing, said member moving in said cavity such that said member seeks an equilibrium position which corresponds to a level position;

at least one mechanism associated with said member for enabling passage of a beam through said member;

an electrical circuit for emitting a beam which passes through said at least one mechanism, said beam being received by said electrical circuit which, in turn, indicates to a user that said leveling device is in or near an equilibrium position and said electrical circuit further varying current such that as the beam intensity increases, the indicator increases in intensity; and a power source coupled with said electrical circuit for energizing said electrical circuit.

28. A power tool, comprising:

a housing;

a motor within said housing;

an output coupled with said motor;

an activation member for energizing said motor for rotating said output;

a power source electrically coupled with said motor and said activation member; and a leveling mechanism comprising:

a housing, a cavity in said housing;

a member in said housing, said member moving in said cavity such that said member seeks an equilibrium position which corresponds to a level position;

at least one mechanism associated with said member for enabling passage of a beam through said member;

an electrical circuit for emitting a beam which passes through said at least one mechanism, said beam being received by said electrical circuit which, in turn, indicates to a user that said leveling device is in or near an equilibrium position and said electrical circuit further varying current such that as the beam intensity increases, the indicator increases in intensity; and a power source coupled with said electrical circuit for energizing said electrical circuit.

* * * * *

UNITED STATES PATENT AND TRADEMARK OFFICE

CERTIFICATE OF CORRECTION

PATENT NO. : 6,810,596 B2

DATED : November 2, 2004

INVENTOR(S) : George C H Fung et al.

It is certified that error appears in the above-identified patent and that said Letters Patent is hereby corrected as shown below:

<u>Column 8,</u>
Line 20, "claim 22" should be -- claim 21 --.
Lines 38 and 40, "devices" should be -- device --.

Signed and Sealed this

Twenty-third Day of August, 2005

JON W. DUDAS
*Director of the United States Patent and Trademark Office*